(12) United States Patent
Baumann

(10) Patent No.: US 9,511,460 B2
(45) Date of Patent: Dec. 6, 2016

(54) LATHE

(75) Inventor: Ulrich Baumann, Lenningen (DE)

(73) Assignee: Traub Drehmaschinen GmbH & Co. KG, Reichenbach (DE)

( * ) Notice: Subject to any disclaimer, the term of this patent is extended or adjusted under 35 U.S.C. 154(b) by 487 days.

(21) Appl. No.: 13/081,154

(22) Filed: Apr. 6, 2011

(65) Prior Publication Data

US 2011/0179918 A1 Jul. 28, 2011

Related U.S. Application Data

(63) Continuation of application No. PCT/EP2009/062746, filed on Oct. 1, 2009.

(30) Foreign Application Priority Data

Oct. 7, 2008 (DE) .................. 10 2008 051 611

(51) Int. Cl.
- *B23B 19/02* (2006.01)
- *B23B 7/02* (2006.01)
- *B23Q 1/76* (2006.01)
- *B23B 7/06* (2006.01)
- *B23B 13/02* (2006.01)

(52) U.S. Cl.
CPC .................. *B23Q 1/763* (2013.01); *B23B 7/06* (2013.01); *B23B 13/02* (2013.01); *Y10T 82/2562* (2015.01)

(58) Field of Classification Search
CPC ....... B23B 13/123; B23B 7/06; B23B 13/02; B23Q 1/763
USPC ......... 82/123, 132, 137, 142, 149, 153, 155, 82/147, 129
See application file for complete search history.

(56) References Cited

U.S. PATENT DOCUMENTS

| | | | | |
|---|---|---|---|---|
| 4,413,539 A | * | 11/1983 | Ishizuka et al. | 82/120 |
| 4,775,160 A | * | 10/1988 | Manschitz | 279/74 |
| 4,780,003 A | * | 10/1988 | Bauer et al. | 384/448 |
| 5,170,686 A | * | 12/1992 | Schalles | 82/142 |
| 5,320,009 A | * | 6/1994 | Habegger | 82/127 |
| 5,924,344 A | * | 7/1999 | Link et al. | 82/129 |

(Continued)

FOREIGN PATENT DOCUMENTS

| | | |
|---|---|---|
| DE | 4023453 C1 | 4/1992 |
| DE | 10048291 A1 | 5/2002 |

(Continued)

*Primary Examiner* — Sara Addisu
(74) *Attorney, Agent, or Firm* — Reinhart Boerner Van Deuren P.C.

(57) ABSTRACT

In order to improve a lathe includes a machine frame, a workpiece spindle unit arranged on the machine frame and having a workpiece spindle housing and a workpiece spindle rotatingly drivable about a workpiece spindle axis in the workpiece spindle housing. A supporting unit which is arranged on the machine frame and in which a workpiece receptacle rotatable about the workpiece spindle axis can be supported on the machine frame radially to the workpiece spindle axis, in such a manner that rotary machining operations other than longitudinal turning are possible in a simple manner. It is suggested that the supporting unit have a bearing member receptacle, in which a guide bushing for longitudinal turning can be supported in the area of its workpiece receptacle in a longitudinal turning version of the lathe and the workpiece spindle unit can be supported in the area of its workpiece receptacle radially to the workpiece spindle axis in a short turning version of the lathe.

13 Claims, 4 Drawing Sheets

(56) References Cited

U.S. PATENT DOCUMENTS

| | | |
|---|---|---|
| 6,665,579 B2 * | 12/2003 | Sasaki et al. .................. 700/159 |
| 7,464,628 B2 * | 12/2008 | Shinohara et al. .............. 82/117 |
| 7,555,973 B2 * | 7/2009 | Asahara et al. ................ 82/117 |
| 8,171,830 B2 * | 5/2012 | Ozawa ............................ 82/147 |
| 2002/0066342 A1 | 6/2002 | Baumann et al. |
| 2007/0151429 A1 * | 7/2007 | Nakaya et al. ................. 82/126 |
| 2007/0227317 A1 | 10/2007 | Asahara et al. |

FOREIGN PATENT DOCUMENTS

| | | |
|---|---|---|
| EP | 1281473 A2 | 2/2003 |
| EP | 1 704 950 A1 | 9/2006 |
| JP | 9225703 A | 9/1997 |

* cited by examiner

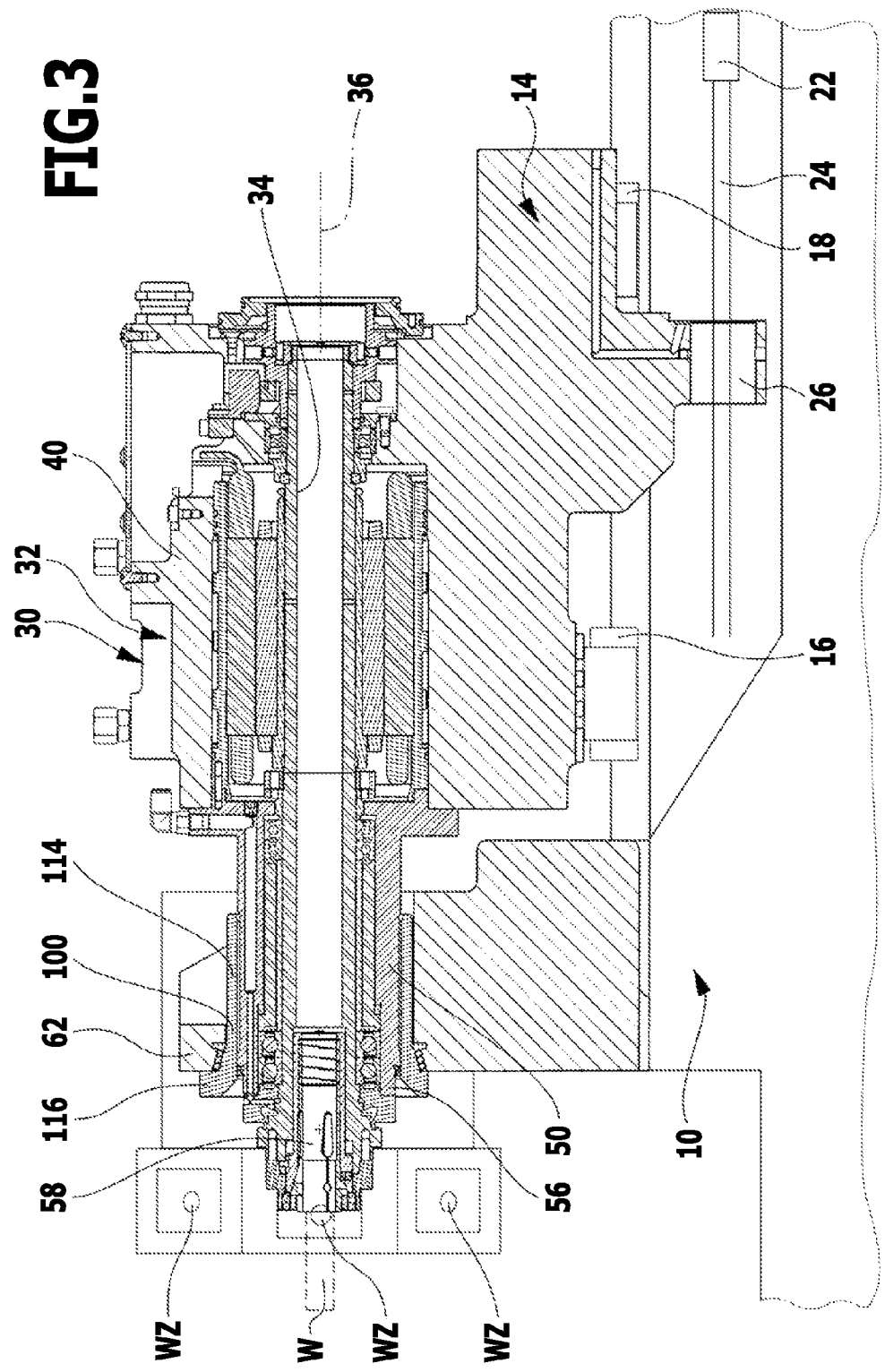

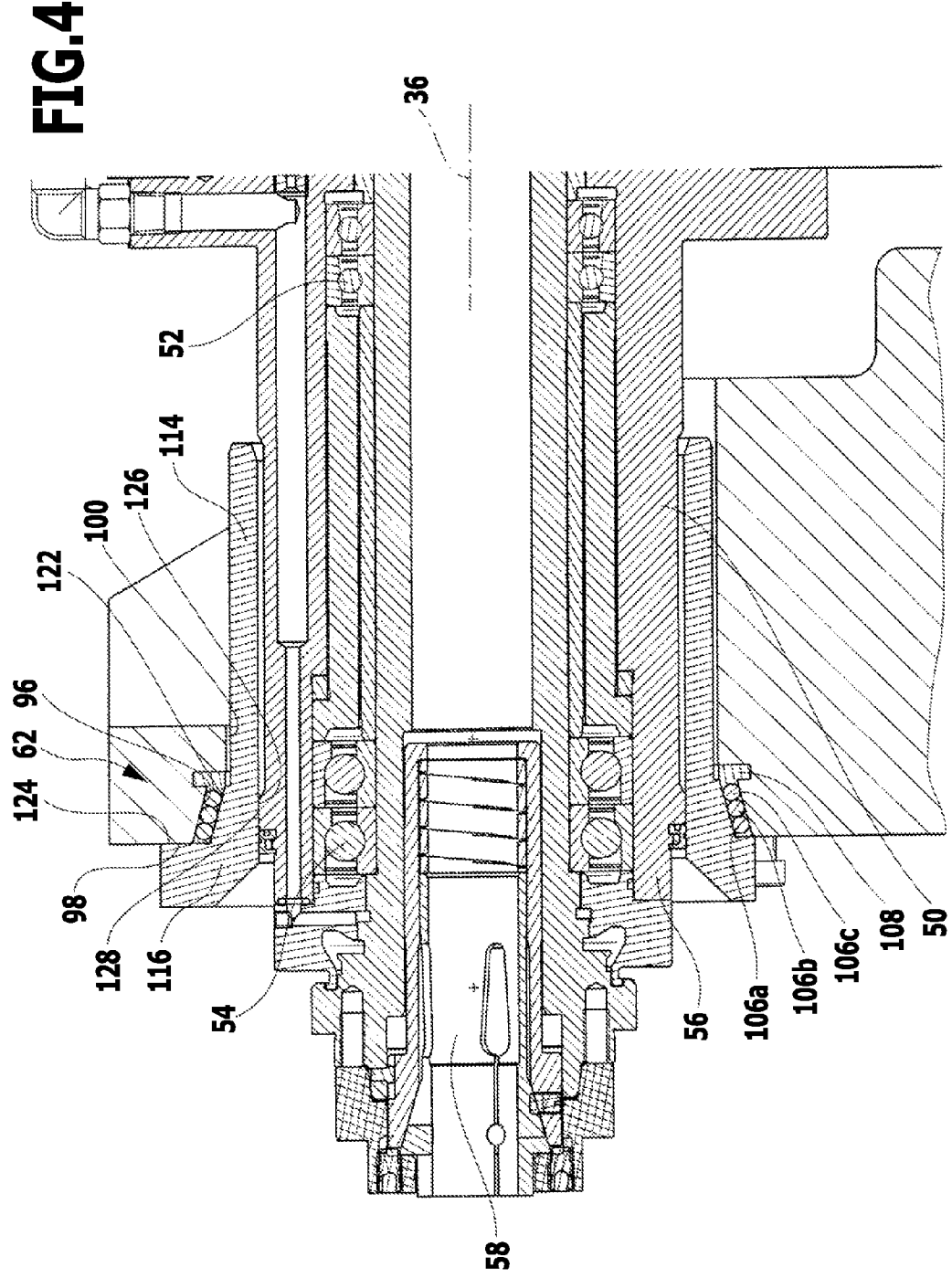

LATHE

This application is a continuation of international application number PCT/EP2009/062746 filed on Oct. 1, 2009.

This patent application claims the benefit of International application No. PCT/EP2009/062746 of Oct. 1, 2009 and German application No. 10 2008 051 611.2 of Oct. 7, 2008, the teachings and disclosure of which are hereby incorporated in their entirety by reference thereto.

BACKGROUND OF THE INVENTION

The invention relates to a lathe comprising a machine frame, a workpiece spindle unit which is arranged on the machine frame and has a workpiece spindle housing and a workpiece spindle which can be rotatingly driven about a workpiece spindle axis in the workpiece spindle housing, a supporting unit which is arranged on the machine frame and in which a workpiece receptacle, which is rotatable about the workpiece spindle axis, can be supported on the machine frame radially to the workpiece spindle axis.

Lathes of this type are known as so-called longitudinal turning lathes, with which the workpiece receptacle is comprised by a guide bushing for longitudinal turning which, for its part, is held on the supporting unit and, therefore, is itself supported directly on the machine frame, wherein such a stationary guide bushing for longitudinal turning serves the purpose of guiding the workpiece, in particular a bar of stock, radially to the workpiece spindle axis in a stable manner as close as possible to a spot to be machined. With such a longitudinal turning lathe, the workpiece spindle, for its part, serves the purpose only of displacing the workpiece, in particular the bar of stock, in a Z direction relative to the guide bushing for longitudinal turning and of driving it rotatingly for the rotary machining.

Only a limited number of workpieces can be machined inexpensively and advantageously with such a longitudinal turning lathe.

The object underlying the invention is, therefore, to improve such a lathe in such a manner that rotary machining operations other than longitudinal turning are possible in a simple manner.

SUMMARY OF THE INVENTION

This object is accomplished in accordance with the invention, in a lathe of the type described at the outset, in that the supporting unit has a bearing member receptacle, in which a guide bushing for longitudinal turning can be supported in the area of its workpiece receptacle in a longitudinal turning version of the lathe and the workpiece spindle unit can be supported in the area of its workpiece receptacle radially to the workpiece spindle axis in a short turning version of the lathe.

The advantage of the solution according to the invention is, therefore, to be seen in the fact that it offers the possibility of converting a lathe in a longitudinal turning version into a short turning version with little resources and, therefore, of being able to exploit, on the one hand, the possibilities of a short turning version of a lathe and, on the other hand, the possibilities of a longitudinal turning version with the same machine in an optimum manner with little resources required for conversion.

It is possible, in particular, with this solution to be able to convert the longitudinal turning version into the short turning version or vice versa quickly without essential parts of the lathe which determine its exactness, such as the workpiece spindle unit or the supporting unit, needing to be removed or modified.

The alternating support of the guide bushing for longitudinal turning or the workpiece spindle unit in the bearing member receptacle may be realized in a particularly simple and inexpensive manner in that a bearing member supporting the guide bushing for longitudinal turning or a bearing member supporting the workpiece spindle unit may be releasably inserted into the bearing member receptacle.

With such bearing members which support either the guide bushing for longitudinal turning or the workpiece spindle unit and can each be releasably inserted into the bearing member receptacle, a conversion may be realized in a simple manner without great resources for the conversion being necessary.

It is particularly favorable when the bearing member can be accommodated in the bearing member receptacle in a clearance-free, clamped manner as a result of forces acting radially to the workpiece spindle axis in order to be able to arrange the bearing member precisely and exactly in relation to the supporting unit in both cases, i.e. in the longitudinal turning version and in the short turning version.

In this respect, it is particularly favorable when, in the case of the support for the guide bushing for longitudinal turning, a bearing member of a housing sleeve thereof can be supported in the bearing member receptacle such that the guide bushing for longitudinal turning experiences a support directly on the supporting unit with its housing sleeve.

Alternatively thereto, it is provided for the workpiece spindle unit to be supported in the bearing member receptacle in a forward area of the workpiece spindle housing with a bearing member of a supporting unit.

In this respect, it is particularly expedient, in order to be able to likewise utilize the Z axis movement of the workpiece spindle unit, when the supporting unit is a supporting sleeve accommodating the forward area of the workpiece spindle housing for displacement in the direction of the workpiece spindle axis.

Alternatively or in addition to the solution described above, a precise support for the workpiece receptacle is possible in one advantageous embodiment of a lathe in that the supporting unit has a bearing member receptacle, in which a bearing member which supports the workpiece receptacle radially to the workpiece spindle axis can be releasably inserted and a radial support of the bearing member in the bearing member receptacle is brought about via supporting members which are elastic on account of their cross-sectional shape.

The provision of such elastic supporting members for supporting the bearing members relative to the bearing member receptacle has the great advantage that, as a result, a rigid and very stable fixing of the bearing member in the bearing member receptacle is possible, on the one hand, and, on the other hand, however, the necessary elasticity can also be provided in order to subject the bearing member constantly to forces acting radially to the workpiece spindle axis and to position it, as a result, free from clearance and in a clamped manner in the bearing member receptacle.

The supporting members are preferably provided with a cross-sectional surface or with two cross-sectional surfaces which allow the necessary elasticity to be ensured simply on account of their variation in shape in a supporting direction, wherein the supporting members are normally likewise formed from the same material as the bearing member receptacle and the bearing members, i.e. are normally of steel, in order to obtain the necessary strength and rigidity for the support of the bearing member.

In this respect, the supporting members can be supported on supporting surfaces of different designs.

One advantageous solution provides, for example, for the supporting members to be supported on supporting surfaces of the bearing member receptacle which extend at an acute angle in relation to the workpiece spindle axis.

It is particularly favorable when the supporting surfaces of the bearing member receptacle extend conically in relation to the workpiece spindle axis so that spheres can, in particular, be used as supporting members, as a result.

Another advantageous solution provides for the supporting members to be supported on supporting surfaces of the bearing member which extend at an acute angle in relation to the workpiece spindle axis.

In this respect, the supporting surfaces of the bearing member are preferably designed such that they extend conically in relation to the workpiece spindle axis.

With receptacle supporting surfaces and bearing member supporting surfaces designed in this manner an elastic deformation of the supporting members arranged between the supporting surfaces of the receptacle and supporting surfaces of the bearing member may be brought about in a simple manner during the insertion of the bearing member into the bearing member receptacle with an insertion direction parallel to the workpiece spindle axis.

For example, the supporting members can be designed as rollers which can be deformed elastically on account of their circular cross section.

It is particularly advantageous when the supporting members are designed as spheres since spheres of this type, as known in conjunction with ball bearings, can be deformed elastically as a result of being acted upon with pressure.

In the case of such receptacle supporting surfaces and bearing member supporting surfaces which extend at an acute angle in relation to the workpiece spindle axis, the position of the bearing member is undefined in the direction of the workpiece spindle axis.

For this reason, it is preferably provided for the bearing member to be supported relative to a receptacle counter surface with a bearing member contact surface in the direction of the workpiece spindle axis.

In this case, as well, it would be conceivable to provide supporting members between the bearing member contact surface and the receptacle counter surface which are elastic on account of their cross-sectional shape, allow a compensation of tolerance on account of their elastic deformation and, in addition, enable a clearance-free tensioning in the direction of the workpiece spindle axis, as well.

For reasons of simplicity, it is, however, provided in one embodiment for the bearing member to abut directly on the receptacle counter surface with the bearing member contact surface.

With respect to carrying out machining of a workpiece in the longitudinal turning version and in the short turning version, no further details have so far been given. In the longitudinal turning version, it is known for the workpiece spindle unit to be able to travel in the direction of a Z axis for the machining of the workpiece. In the short turning version, a movement in the direction of the Z axis by a tool carrier could take place for the machining of the workpiece without any movement of the workpiece spindle unit being required or possible.

In one embodiment according to the invention, it is, however, provided for the workpiece spindle unit to be able to travel in the direction of a Z axis in a controlled manner for the machining of the workpiece not only in the longitudinal turning version but also in the short turning version.

Additional features and advantages of the invention are the subject matter of the following description as well as the drawings illustrating several embodiments.

BRIEF DESCRIPTION OF THE DRAWINGS

FIG. 3 shows a side view with a longitudinal section similar to FIG. 1 of a second embodiment of a lathe according to the invention in a short turning version and FIG. 4 shows a section similar to FIG. 2 of a forward area of the workpiece spindle unit and the supporting unit.

DETAILED DESCRIPTION OF THE INVENTION

Figure 1:
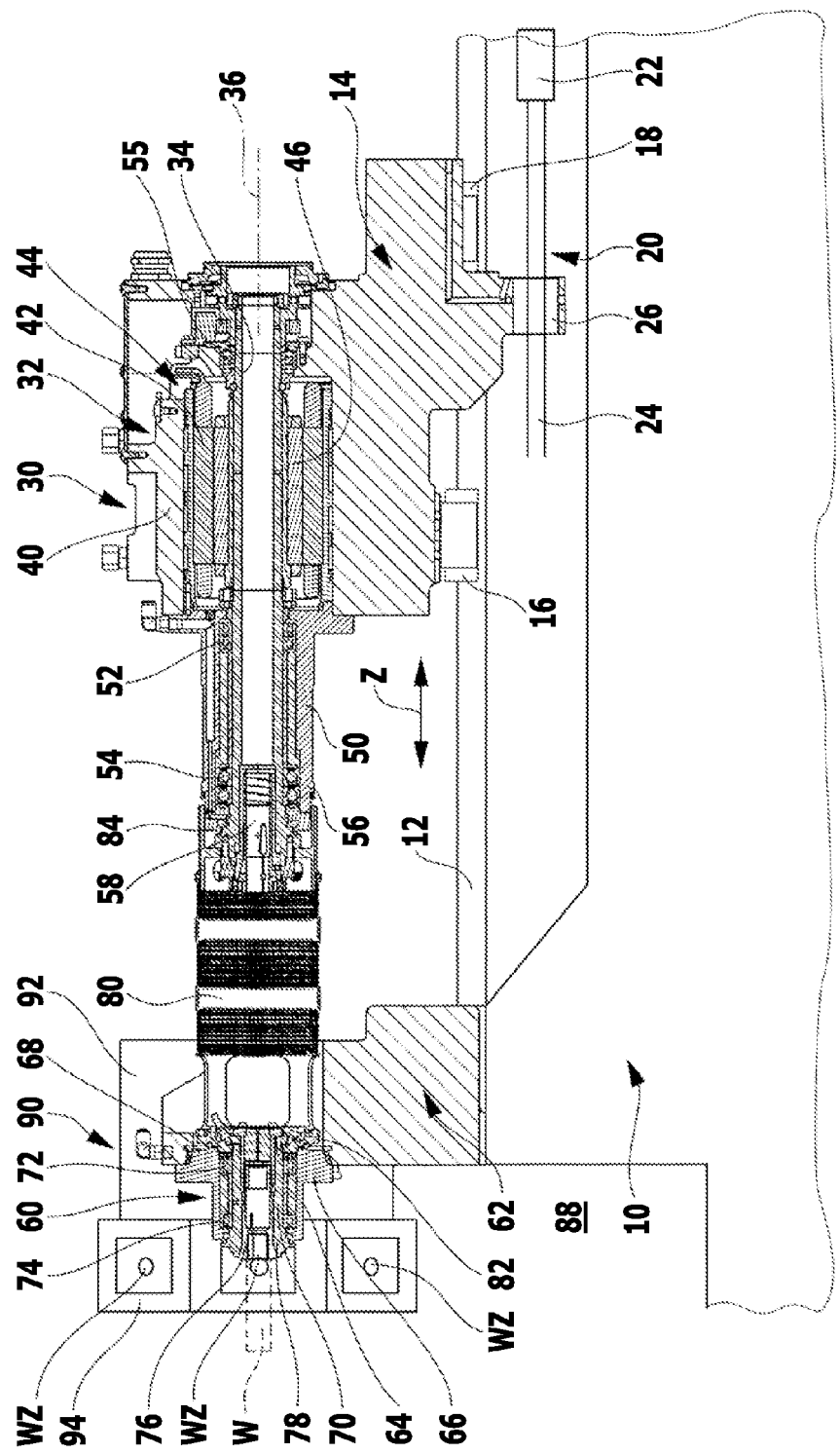
FIG. 1 shows a side view of a first embodiment of a lathe according to the invention in a longitudinal turning version with a longitudinal section through a workpiece spindle unit and a guide bushing for longitudinal turning.

A first embodiment of a lathe according to the invention, which is designed as a longitudinal turning version and illustrated in FIG. 1, comprises a machine frame which is designated as a whole as 10 and has guides 12 which extend in the direction of a Z axis and on which a Z slide 14, which can be moved in the Z direction, is guided for displacement with guide members 16 and 18.

Furthermore, the Z slide 14 can be moved, driven by a Z axis drive 20, wherein the Z axis drive 20 comprises a drive motor 22, a threaded spindle 24 driven by it and a spindle nut 26 rigidly connected to the Z slide so that the spindle nut 26 can be displaced in the Z direction together with the Z slide 14 when the threaded spindle 14 is driven by the drive motor 22.

A workpiece spindle unit designated as a whole as 30 is seated on the Z slide 14 and has a workpiece spindle housing which is designated as a whole as 32 and in which a workpiece spindle designated as 34 is mounted for rotation about a workpiece spindle axis 36.

The workpiece spindle housing 32 comprises, for its part, a housing member 40 which is seated directly on the Z slide and in which a stator 42 of a spindle motor designated as 44 is arranged which has, in addition, a rotor 46 which is seated on the workpiece spindle 34 in the area of the stator 42 and co-rotates with it.

The workpiece spindle housing 32 comprises, in addition, a bearing tube 50 which extends from the housing member 40 in the direction of the workpiece spindle axis 36, extends in a freely projecting manner relative to the housing member 40 and the Z slide and in which a first spindle bearing 52 and a second spindle bearing 54 are arranged, wherein the first spindle bearing 52 is arranged to adjoin the spindle motor 44 and the second spindle bearing 54 on a side of the first spindle bearing 52 facing away from the spindle motor 44.

The first spindle bearing 52 and the second spindle bearing 54 serve the purpose of the defined guidance and rotatable mounting of the workpiece spindle 34 in the bearing tube 50 of the workpiece spindle housing 32, wherein the second spindle bearing 54 mounts the workpiece spindle 34 in the area of a forward end 56 of the bearing tube 50 and in the area of a clamping device 58 of the workpiece spindle 34. In addition, the workpiece spindle 34 is mounted on the housing member 40 on a side of the spindle motor 44 facing away from the spindle bearing 52 with a rearward spindle bearing 55.

The clamping device 58 serves to fix a workpiece in place, preferably a bar of stock W, namely for fixing the bar of stock against any movement in the direction of the workpiece spindle axis 36 and for the rotary drive of the bar of stock W.

The embodiment of the lathe according to the invention, illustrated in FIG. 1, is designed as a so-called longitudinal turning lathe, with which the workpiece, in this case the bar of stock W, is guided during the machining by a guide bushing for longitudinal turning which is designated as a whole as 60 and is supported, for its part, directly on the machine frame 10 by means of a supporting unit 62.

The guide bushing 60 for longitudinal turning comprises a housing sleeve 64 which bears a bearing member 66 which, for its part, can be releasably inserted into a bearing member receptacle 68 of the supporting unit 62.

A rotatable workpiece receptacle 70 is provided in the housing sleeve 64 and comprises a receptacle bushing 76 which is rotatably mounted in the housing sleeve 64 with two rotary bearings 72 and 74 and, for its part, is provided with clamping elements 78 for the clearance-free accommodation and precise, radial guidance of the bar of stock W for sliding displacement in the direction of the Z axis.

The workpiece receptacle 70 is preferably coupled non-rotatably to the workpiece spindle 34, namely by a telescopic tube 80 which extends between a holding flange 82 connected to the workpiece receptacle 70 and a front end 84 of the workpiece spindle 34 facing the guide bushing 60 for longitudinal turning and is thereby coupled non-rotatably to the workpiece spindle 34.

Furthermore, a tool carrier designated as a whole as 90 is provided on the machine frame 10, is designed, for example, as a tool turret and has a turret housing 92 which bears a rotatable turret head 94 which is located in a working space 88 arranged on a side of the supporting unit 62 located opposite the workpiece spindle unit 30, wherein individual machining tools WZ, with which machining of the bar of stock W can be carried out in the working space 88, are arranged on the turret head 94.

In a longitudinal turning lathe, the precise guidance of the bar of stock W during machining by the tools 96 is brought about by means of the guide bushing 60 for longitudinal turning and so the guide bushing 60 for longitudinal turning is, for its part, to be arranged and guided precisely relative to the machine frame 10.

This means that the guide bushing 60 for longitudinal turning must be positioned precisely in the supporting unit 62.

Figure 2:
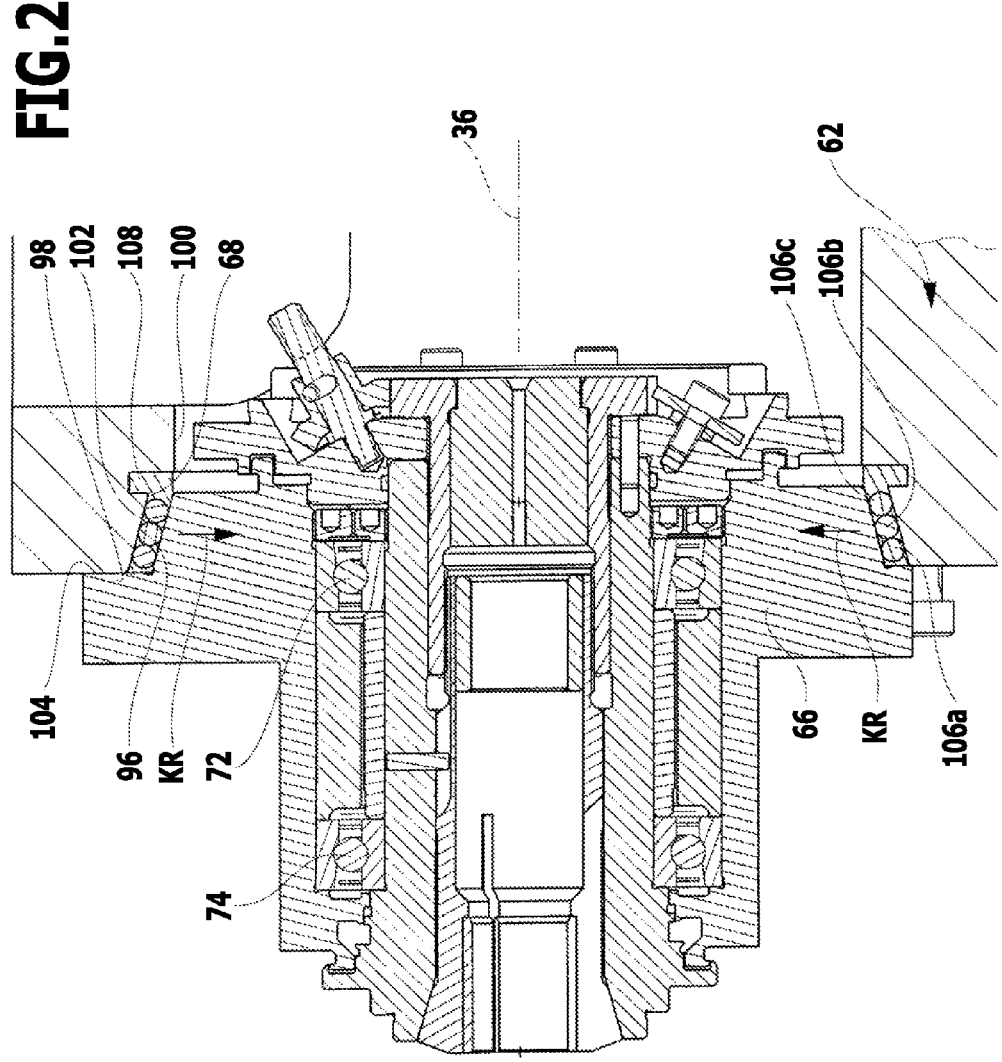
FIG. 2 shows an enlarged section of FIG. 1 in the area of the guide bushing for longitudinal turning and a supporting unit.

For this purpose, the supporting unit 62 comprises in the area of the bearing member receptacle 68, as illustrated on an enlarged scale in FIG. 2, a receptacle supporting surface 96 which extends conically in relation to the workpiece spindle axis 36, a receptacle counter surface 98 which extends at right angles in relation to the workpiece spindle axis 36 and faces, for example, the working space 88, as well as an opening 100 which adjoins the receptacle supporting surface 96 and passes through the supporting unit 62 in the direction of the workpiece spindle unit 30 and through which the telescopic tube 80 extends.

Furthermore, the bearing member 66 of the guide bushing 60 for longitudinal turning comprises, for its part, a bearing member supporting surface 102 which extends conically in relation to the workpiece spindle axis 36 as well as a bearing member contact surface 104 which extends at right angles in relation to the workpiece spindle axis 36.

In order to keep the bearing member 66 aligned as exactly and clearance-free as possible in the bearing member receptacle 68, supporting members 106 are provided between the receptacle supporting surface 96 and the bearing member supporting surface 102 and are designed as rollers, preferably as spheres, and, on account of their cross-sectional shape, display an elastic behavior when acted upon with a force which makes it possible for an elastic force extending transversely to the receptacle supporting surface 96 and the bearing member supporting surface 102 to be active between them, this force having the tendency to act on the receptacle supporting surface 96 and the bearing member supporting surface 102 in the sense of increasing the distance between them and, therefore, of acting on the bearing member 66 in the area of its bearing member supporting surface 102 with a force component KR which extends radially to the workpiece spindle axis 36 and keeps the bearing member 66 centered in the bearing member receptacle 68 in a clearance-free manner.

The axial positioning of the bearing member 66 relative to the supporting unit 62 with the bearing member receptacle 68 is brought about by way of a direct abutment of the bearing member contact surface 104 on the receptacle counter surface 98 without any elastic bodies arranged between them in order to achieve an exact positioning of the bearing member 66 in the direction of the workpiece spindle axis 36.

For the purpose of the relative fixing of the supporting members 106 between the receptacle supporting surface 96 and the bearing member supporting surface 102, they are arranged in a supporting member cage 108 which, for its part, can be fixed in place on the supporting unit 62.

The supporting members 106 are preferably steel spheres, in the same way as those used for ball bearings.

In this respect, the supporting members 106 can be arranged so as to be evenly distributed in circumferential direction over the receptacle supporting surface 96 and the bearing member supporting surface 102 or the bearing members 106 are arranged at certain angular distances from one another in circumferential direction, for example at angular distances of between 30° and 120°.

The machine tool according to the first embodiment, illustrated in FIGS. 1 and 2, can, as illustrated in FIGS. 3 and 4, be converted as a short turning version into a machine tool according to a second embodiment, wherein in this second embodiment the guide bushing 60 for longitudinal turning is removed and the workpiece spindle unit 30 is moved in the direction of the supporting unit to such an extent that the bearing tube 62 of the workpiece spindle housing 32 passes through the opening 100 of the supporting unit 62 and projects with its forward area 56 into the working space 88 on a side of the supporting unit 62 located opposite the housing 40 in order to thus suitably position the workpiece or the bar of stock W for machining with one of the tools WZ.

In this respect, the workpiece or the bar of stock W is fixed and positioned relative to the machine frame 10 by means of the clamping device 58 of the workpiece spindle 34.

In order to bring about, in particular, a positionally stable support for the workpiece spindle 34 relative to the machine frame 10, the bearing tube 50 is, so as to be displaceable in the direction of the Z axis, accommodated in a bearing tube sleeve 114 which is provided with a bearing member 116 which, for its part, has a bearing member supporting surface 122 and a bearing member contact surface 124, in the same way as the bearing member 66, wherein the supporting members 106 already described are arranged between the bearing member supporting surface 102 and the receptacle supporting surface 96 in the supporting member cage 108 and alternatingly support them as well as allow a clearance-free accommodation of the bearing member 116 in the bearing member receptacle 68.

The precise guidance of the bearing tube 50 in the bearing tube sleeve 114 for displacement in the direction of the Z axis is brought about by an inner surface 126 of the bearing tube sleeve 114 which is machined to fit exactly as well as an outer surface 128 of the bearing tube 50 which is likewise machined to fit exactly, these surfaces being preferably ground and guided exactly relative to one another either hydrostatically or hydrodynamically by lubricant penetrating between them.

Furthermore, the bearing member 116 abuts with its bearing member contact surface 124 on the receptacle counter surface 98 so that the bearing member 116 is, therefore, positioned exactly in the direction of the workpiece spindle axis 36.

As a result, it is possible to realize a so-called short turning lathe from a lathe designed according to FIGS. 1 and 2 as a longitudinal turning lathe merely by removing the guide bushing 60 for longitudinal turning from the supporting unit 62, wherein, in this case, the exact alignment of the workpiece or the bar of stock W relative to the tools WZ is likewise brought about in that the bearing tube of the workpiece spindle 34 is supported on the supporting unit 62.

As a result, the same alignment of the workpiece or the bar of stock W relative to the tools WZ is ensured when operating the lathe as a short turning lathe.

It is possible not only in the longitudinal turning version illustrated in FIGS. 1 and 2 as well as in the short turning version illustrated in FIGS. 3 and 4, to realize the movement of the workpiece or the bar of stock W in the direction of the Z axis relative to the tools WZ by way of a controlled displacement of the workpiece spindle unit in a Z direction, for example with a computer numerical control, so that in both versions there is no necessity for the tools WZ to be moved in the direction of the Z axis and so, in the minimal case, a movement of the tools WZ in a so-called X direction transversely to the workpiece spindle axis 36 is sufficient.

This movability of the tools WZ in the X direction can be improved further by an additional movability of the tools WZ in a Y direction which extends transversely to the X direction and to the spindle axis 36, which is advantageous, in particular, when rotatingly driven tools WZ are used in order to be able to carry out a complete machining of the workpiece or the bar of stock W with these tools in addition to the normal tools for rotary machining.

The invention claimed is:

1. A lathe for performing longitudinal turning or short turning comprising a machine frame, a workpiece spindle unit arranged on the machine frame and having a non-rotatable bearing tube, a workpiece spindle housing and a workpiece spindle rotatingly drivable about a workpiece spindle axis in the workpiece spindle housing, said workpiece spindle being rotatably supported in said non-rotatable bearing tube and having a spindle workpiece receptacle for receiving a workpiece, a non-rotatable or stationary supporting unit arranged on the machine frame, the non-rotatable or stationary supporting unit having a bearing member receptacle, and a guide bushing for longitudinal turning, said guide bushing comprising a non-rotatable housing sleeve and a receptacle bushing rotatably mounted on said non-rotatable housing sleeve by at least one bearing and said receptacle bushing having a workpiece receptacle for receiving the workpiece, said non-rotatable housing sleeve being supportable in said bearing member receptacle in an area surrounding or circumscribing the workpiece receptacle radially to the workpiece spindle axis when converted in a longitudinal turning version of the lathe, when converted in a short turning version of the lathe, said guide bushing is removed and the workpiece spindle unit is moved in the direction of the non-rotatable or stationary supporting unit such that the non-rotatable bearing tube is supported in said bearing member receptacle of the non-rotatable or stationary supporting unit.

2. The lathe of claim 1, wherein a bearing member supporting the guide bushing for longitudinal turning or a bearing member supporting the workpiece spindle unit is releasably insertable into the bearing member receptacle.

3. The lathe of claim 2, wherein the bearing member is adapted to be accommodated in the bearing member receptacle in a clearance-free, clamped manner as a result of forces acting radially to the workpiece spindle axis.

4. The lathe of claim 1, wherein the workpiece spindle unit is adapted to be supported in the bearing member receptacle in a forward area of the workpiece spindle housing with a bearing member of the non-rotatable or stationary supporting unit, for the short turning version of the lathe.

5. The lathe of claim 4, wherein the non-rotatable or stationary supporting unit comprises a sleeve which accommodates the forward area of the workpiece spindle housing for displacement in the direction of the workpiece spindle axis.

6. The lathe of claim 1, wherein the workpiece spindle unit is adapted to travel in the direction of a Z axis in a controlled manner for the machining of the workpiece both in the longitudinal turning version and in the short turning version.

7. The lathe of claim 1, wherein a radial support of a bearing member in the bearing member receptacle is brought about via supporting members elastic on account of their cross-section shape.

8. The lathe of claim 7, wherein the supporting members are designed as spheres.

9. The lathe of claim 1, wherein the non-rotatable housing sleeve bears a bearing member, a radial support of the bearing member in the bearing member receptacle being brought about via supporting members elastic on account of their cross-section shape; and wherein the supporting members are adapted to be supported on supporting surfaces of the bearing member receptacle extending at an acute angle in relation to the workpiece spindle axis.

10. The lathe of claim 9, wherein the supporting surfaces of the bearing member receptacles extend conically in relation to the workpiece spindle axis.

11. The lathe of claim 9, wherein the supporting members are adapted to be supported on supporting surfaces of the bearing member extending at an acute angle in relation to the workpiece spindle axis.

12. The lath of claim 9, wherein the bearing member is supported relative to a receptacle counter surface with a bearing member contact surface in a direction perpendicular to the workpiece spindle axis.

13. The lathe of claim 12, wherein the bearing member abuts directly on the receptacle counter surface with the bearing member contact surface.

* * * * *